United States Patent [19]

Kavehrad

[11] Patent Number: 4,577,330
[45] Date of Patent: Mar. 18, 1986

[54] CROSS-POLARIZATION INTERFERENCE CANCELLATION ARRANGEMENT FOR DIGITAL RADIO CHANNELS

[75] Inventor: Mohsen Kavehrad, Hudson, N.H.

[73] Assignee: AT&T Bell Laboratories, Murray Hill, N.J.

[21] Appl. No.: 602,055

[22] Filed: Apr. 19, 1984

[51] Int. Cl.$^4$ .............................................. H03H 7/30
[52] U.S. Cl. .................................... 375/15; 375/102; 455/295
[58] Field of Search ...................... 375/11, 14, 15, 102, 375/99, 58; 455/60, 63, 65, 303, 305, 306, 295; 370/6; 343/361, 362

[56] References Cited

U.S. PATENT DOCUMENTS

| | | | |
|---|---|---|---|
| 3,735,266 | 5/1973 | Amitay | 370/6 |
| 4,090,137 | 5/1978 | Soma et al. | 455/60 |
| 4,112,370 | 9/1978 | Monsen | 375/14 |
| 4,220,923 | 9/1980 | Pelchat et al. | 375/101 |
| 4,283,795 | 8/1981 | Steinberger | 455/283 |
| 4,321,705 | 3/1982 | Namiki | 375/14 |
| 4,367,555 | 1/1983 | Namiki et al. | 375/11 |
| 4,466,132 | 8/1984 | Namiki | 455/295 |
| 4,479,258 | 10/1984 | Namiki | 455/60 |

OTHER PUBLICATIONS

IEEE Trans. on Comm., vol. COM-24(9), Sep., 1976, "An Automatic Control . . . ", by H. Kannowade, pp. 986-999.
ICC '79, Boston, Mass., Jun., 1981, vol. 3, "A Decision-Directed Network . . . ", by W. J. Weber, III, pp. 40.4.1-40.4.7.
ICC '81, Denver, Colo., Jun., 1981, vol. 3, "Adaptive Receiver for . . . ", by J. Namiki et al, pp. 46.3.1-46.3.5.
ICC '82, Phila., Pa., Jun. 1982, "Design of a Terrestrial Cross Pol Canceler", by M. L. Steinberger, pp. 2B.6.1-2B.6.5.
Globecom '83, San Diego, Ca., Nov., 1983, "Adaptive Cross Polarization . . . ", by M. Kavehrad.

Primary Examiner—Robert L. Griffin
Assistant Examiner—Stephen Chin
Attorney, Agent, or Firm—Erwin W. Pfeifle

[57] ABSTRACT

The present invention relates to a cross-polarization cancellation arrangement for digital radio channels wherein the cancellation arrangement comprises a canceller section and an equalizer section in cascade which operate at baseband. The canceller section includes both a main lobe estimator and detection circuits. The estimator provides a preliminary estimate of the main lobe of the pulse response in each of the two received orthogonally polarized signals. The detection circuits take each of the estimator means output signals, relating to each received polarized signal, and generates therefrom error control signals for adaptively updating the main lobe estimate signals from the estimator and also to provide an output signal which is used to cancel the interferer main lobe in the received oppositely polarized signal. The equalizer section then mitigates intersymbol and cross-rail interference in each of the orthogonally received signals.

6 Claims, 13 Drawing Figures $\Gamma = 0.45, T_S = 1/(22.5\ \text{Mbaud})$,
$\text{SNR} = 60\ \text{dB}, \tau_m = 0., \theta_m = 0.$

CROSS-POLARIZATION INTERFERENCE CANCELLATION ARRANGEMENT FOR DIGITAL RADIO CHANNELS

TECHNICAL FIELD

The present invention relates to a technique for cross-polarization interference cancellation in digital radio channels and, more particularly, to a cross-polarization interference cancellation arrangement comprising a canceller and equalizer in cascade. The preliminary decision making circuit of the canceller provides an estimate of the main lobe of each received polarized signal and, after properly weighting the estimates, eliminates the interfering main lobe from each polarized signal, and the equalizer is used to mitigate intersymbol and cross-rail interference in each received signal.

DESCRIPTION OF THE PRIOR ART

Bandwidth efficiency of a terrestrial or satellite radio route can be doubled by frequency reuse via orthogonally polarized channels. Such systems transmit two different information signals of the same bandwidth and the same carrier frequency by using a separate orthogonal field polarization for the transmission of each signal. Nonideal antennas and transmission media, however, cause cross-coupling of the two signals and cross-polarization interference. When such technique is used, cross-polarization components in each of the polarized signals, induced during transmission and reception, should be kept at an acceptable level as required by the radio system.

Various techniques have been devised to provide adequate cross-polarization cancellation. One such technique is the transmission of a separate pilot signal with each polarized signal. Each pilot signal is detected at the receiver and used for generating control signals in either feedback or feed-forward control arrangements to reduce the cross-polarization components. In this regard see, for example, U.S. Pat. Nos. 3,735,266 issued to N. Amitay on May 22, 1973; and 4,090,137 issued to S. Soma et al on May 16, 1978.

Another technique is to provide an adaptive feedback type cross-polarization canceller where corrective control signals are generated from the received dual-polarized signals and fed back to circuits for adaptively reducing the cross-polarized components in each of the received dual-polarized signals. In this regard see, for example, U.S. Pat. No. 4,283,795 issued to M. L. Steinberger on Aug. 11, 1981 where a desired polarized signal and a cross-polarized interfering signal are received and separated for propagation along separate paths. The interfering signal is appropriately adjusted in phase and amplitude and then recombined with the desired signal to cancel the component of the interfering signal found in the desired signal. Another adaptive feedback arrangement is disclosed in the article by W. J. Weber III, in ICC '79, Vol. 3, Boston, Mass., June 1979, at pages 40.4.1 to 40.4.7. There, baseband processing is used in a data detection circuit to generate control signals which are applied to an IF correction network for cross-polarization component cancellation in each of the received dual polarized signals.

The problem in the prior art, however, is to provide a cross-polarization cancellation arrangement which is simpler than present cross-polarization cancellation arrangements and will adaptively cancel cross-polarization interference to permit M-QAM signals to be transmitted in the dual-polarization mode while achieving an outage performance equivalent to a single polarization system when subjected to dispersive fading.

SUMMARY OF THE INVENTION

The foregoing problem in the prior art has been solved in accordance with the present invention which relates to a technique for cross-polarization cancellation in digital radio channels and, more particularly, to a cross-polarization interference cancellation arrangement comprising a canceller and an equalizer in cascade. The canceller preliminary estimator circuit provides an estimate of the main lobe of each received polarized signal and, after properly weighting the estimates, eliminates the interfering main lobe from the opposite polarized signal. The equalizer is then used to mitigate intersymbol and cross-rail interference in each received signal.

Other and further aspects of the present invention will become apparent during the course of the following description and by reference to the accompanying drawings.

BRIEF DESCRIPTION OF THE DRAWINGS

Referring now to the drawing.

DETAILED DESCRIPTION

In accordance with the present invention, a method of cross-polarization cancellation is provided for use in the dual-polarized operation of M-QAM signals over dispersive fading channels like those experienced in, for example, line-of-sight terrestrial radio applications. The present canceller is designed to operate at baseband and improve the dual-polarization system performance to very nearly the performance of a single-polarization system. As may be seen with the hereinafter description of the canceller arrangement, the design is based on an observation that the power loss associated with a cross-coupled signal subject to flat or dispersive fading brings about an actual reduction in system outage time.

Figure 1:
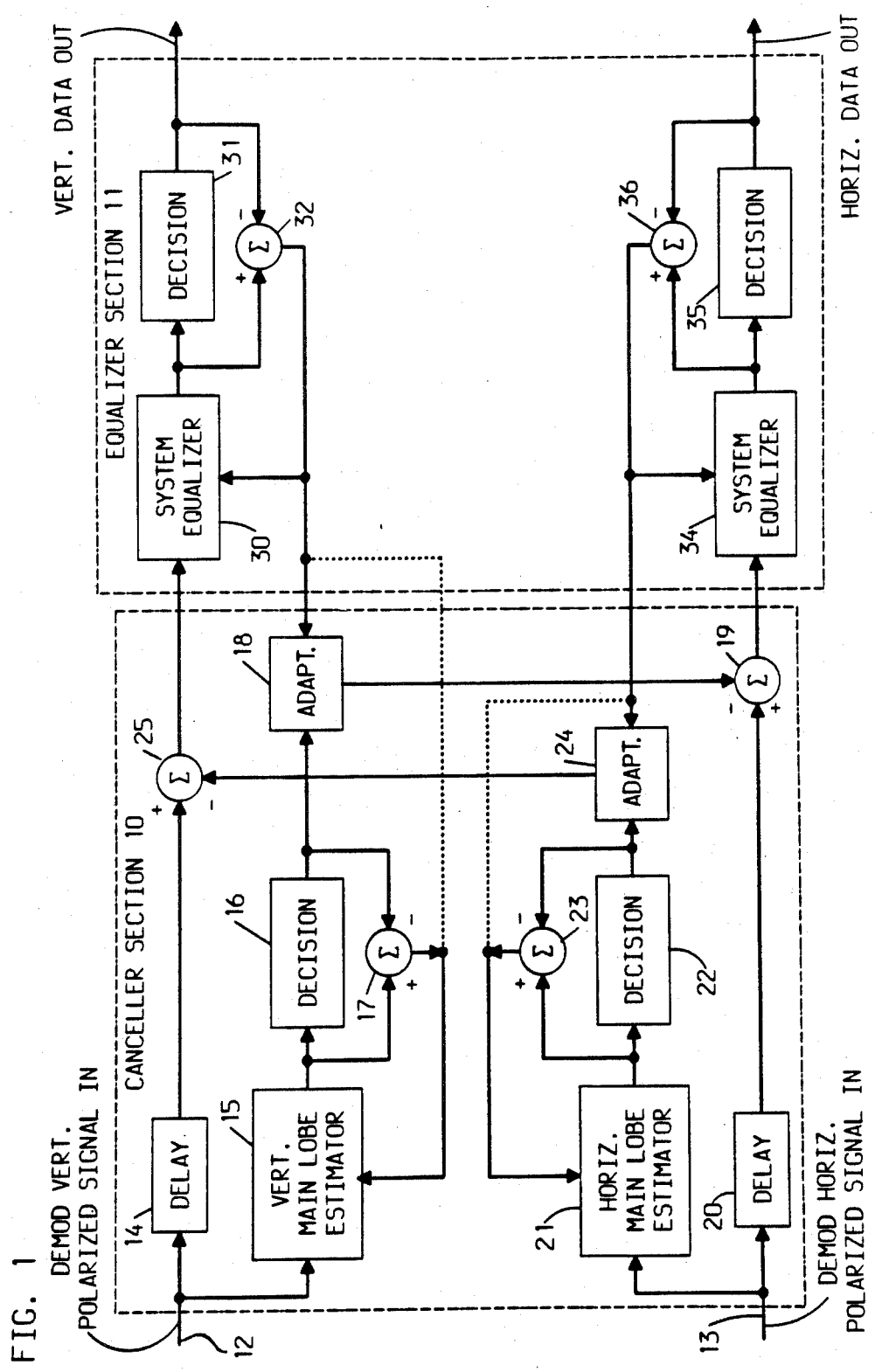
FIG. 1 is a block diagram of a cross-polarization cancellation arrangement in accordance with the present invention.

FIG. 1 is a block diagram of a cross-polarization cancellation arrangement in accordance with the present invention, which comprises a cascade arrangement of a canceller section 10 and an equalizer section 11. Prior to describing the elements forming the individual canceller and equalizer sections 10 and 11, the underlying concepts in the design of the present cross-polarization canceller will be described to provide a clear understanding of the present canceller and its operation.

Figure 2:
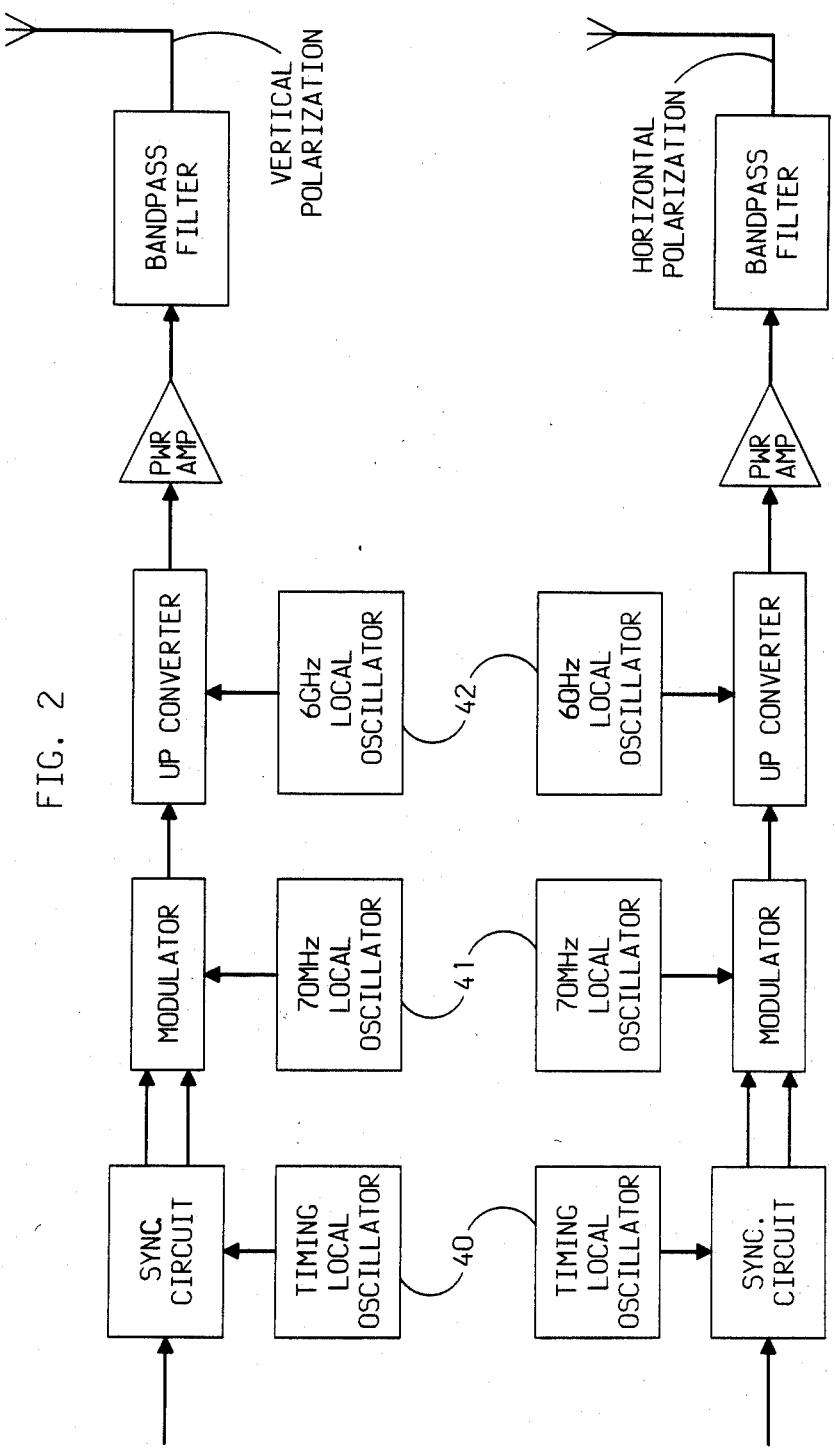
FIG. 2 is a block diagram of a typical dual-polarized system transmitter.

Illustrated in FIG. 2 is a typical dual-polarization system transmitter configuration. As seen, there are three major sets of local oscillators in the transmitter system that can play an important role in modeling a dual-polarization system. Namely, local oscillators 40 used to provide clock timing to baseband sequences, IF local oscillators 41 providing carrier signals to modulators, and microwave upconverter oscillators 42. With baseband cancellation, receiver implementation is simpler if the microwave local oscillators 42 are synchronized, although that is not a necessity. The IF local oscillators 41 do not have to be synchronous at the transmitter either. However, lack of synchronization requires doubling parts of the receiver circuitry before baseband cross-polarization cancellation can take place. Therefore, both cases of having synchronous or asynchronous IF local oscillators 41 will be considered. Finally, the baseband sequence timing oscillators 40 may or may not be synchronized.

For the general case of asynchronous IF and timing local oscillators 41 and 40, the phenomenon of frequency drift and frequency differences of the oscillators is usually modeled as a uniformly distributed random phase, taking on values between 0 and $2\pi$ for the IF local oscillators 41 and a uniformly distributed random time shift, taking on values between 0 and $T_s$ for the timing local oscillators 40. The two specified random parameters are imposed on one of the two polarizations. In one case we assume a delay between two paths of $0 \leq \tau_m \leq T_s$ and a phase shift between orthogonal polarizations of $0 \leq \theta_m \leq 2\pi$, that is, asynchronous IF and timing local oscillators 41 and 40. In the other case, we assume $\tau_m=0$ and $\theta_m=0$, that is, synchronous oscillators and investigate the overall system performance. Note that these are two extreme situations and should provide sufficient insight into the role that transmit local oscillator synchronization can play.

The optimum phase between a modulator and a demodulator of the main polarization signal (i=I) for optimum timing is introduced by $\phi_I$. Note that for a strong main polarization signal, and because of the incoherency of the cross-coupled signal, $\phi_I$ is imposed on the latter by the main polarization demodulator forming a part of the receiver circuitry prior to the present canceller.

The dispersive nature of the multipath channel is completely described by the superposition of four pulse responses, each independently weighted by an appropriate transmitted symbol state. These pulse responses for the $k^{th}$ transmitted symbol are:

$$U_{i,I} = a_I\{p(t - kT_s) \cos(\phi_I) + \rho_I p(t - kT_s - \tau_I) \cos[(\omega_c - \omega_{0I})\tau_I + \pi + \phi_I]\}, \quad (1)$$

$$U_{q,I} = a_I\{p(t - kT_s) \sin(\phi_I) + \rho_I p(t - kT_s - \tau_I) \sin[(\omega_c - \omega_{0I})\tau_I + \pi + \phi_I]\}, \quad (2)$$

$$U_{i,II} = a_{II}\{p(t - kT_s - \tau_m) \cos(\phi_I + \theta_m) + \rho_{II} p(t - kT_s - \tau_{II} - \tau_m) \cos[(\omega_c - \omega_{0II})\tau_{II} + \pi + \phi_I + \theta_m]\}, \quad (3)$$

and $$U_{q,II} = a_{II}\{p(t - kT_s - \tau_m) \sin(\phi_I + \theta_m) + \rho_{II} p(t - kT_s - \tau_{II} - \tau_m) \sin[(\omega_c - \omega_{0II})\tau_{II} + \pi + \phi_I + \theta_m]\}, \quad (4)$$

where I and II represent the main and cross-polarized paths, respectively; $kT_s$ represents consecutive instants with $k=0,1,2,\ldots$; and $T_s$ is a baud period. The Nyquist-shaping filter impulse response is denoted by p(t) and $\omega_c$ is the nominal carrier frequency. The parameters $a_i$, $\rho_i$, $\omega_{0i}$, $\tau_i$: i=I,II represent the flat fade level, fade notch depth, fade notch positions, and relative delay between the two rays in each of the multipath fading models of the main and cross-polarized paths. For the received in-phase part of the main polarization signal, equations (1) and (2) describe the distorted in-phase and quadrature-coupled signals from the main polarization transmitter, respectively, and equations (3) and (4) describe the corresponding signals from the cross-polarized interferer.

Figure 3:
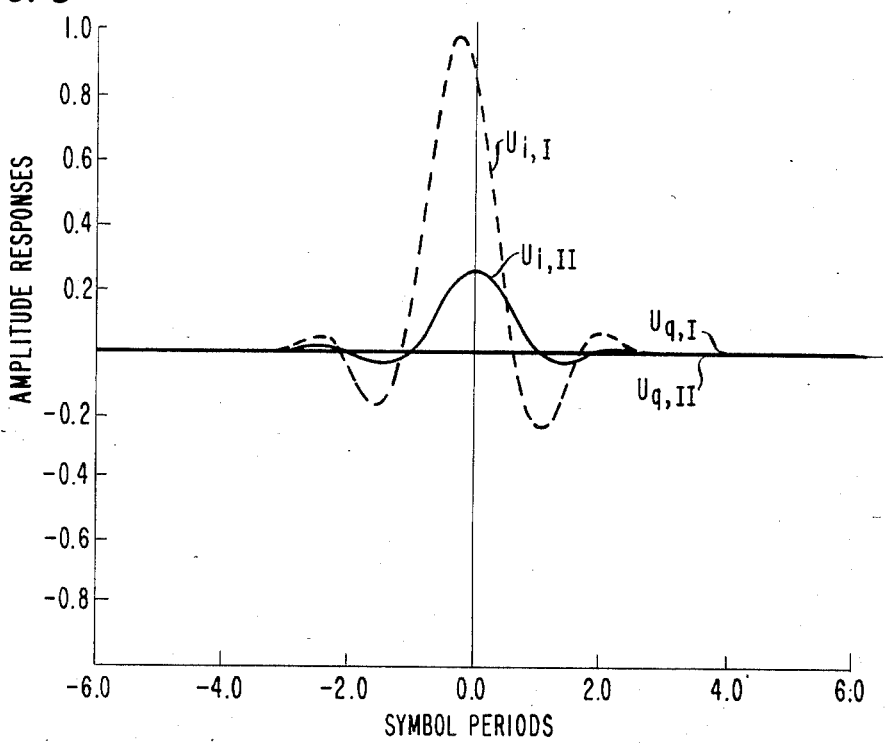
FIG. 3 illustrates typical 16-QAM signal time domain pulse responses with a notch-centered fade of 10-dB applied to the main polarization path.
Figure 4:
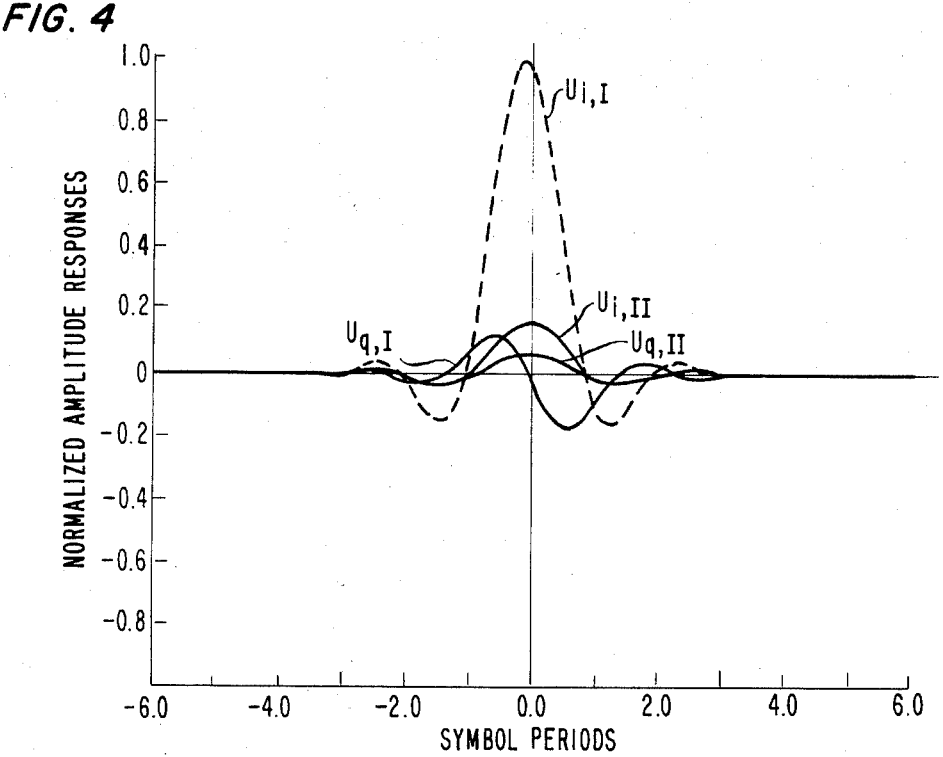
FIG. 4 illustrates typical 16-QAM signal time domain pulse responses with an 11-MHz offset fade of 7.5-dB depth applied to the main polarization path.

To introduce the parameters which define the fading character of the interfering cross-coupled signal path, each interferer fading event is associated with a triplet representing its dispersive fading status. This triplet is:

$$\left[ 20 \log \frac{a_{II}}{a_I} \text{ (dB)}, -20 \log |1 - \rho_{II}| \text{(dB)}, \Delta f_{0II} \text{(MHz)} \right], \quad (5)$$

where $a_{II}$ and $a_I$ represent the flat fade levels for cross-coupled and main signals, respectively. In the triplet, $\rho_{II}$ is dispersive fade notch depth, and $\Delta f_{0II}$ denotes fade notch positions relative to the carrier frequency of the cross-polarized path. For illustration purposes, equations (1) through (4) are demonstrated in FIGS. 3 and 4 for $\tau_m=0$, $\theta_m=0$, an interferer of $(-20,0,0)$ fade and two different fade conditions of the main polarization path. In FIG. 3, the aforementioned pulse responses are illustrated when a notch-centered fade of 10-dB depth is applied to the main polarization signal. It should be noted that since the main polarization signal fade is notch centered and $\theta_m=0$, $U_{q,I}$ and $U_{q,II}$ are both zero. In FIG. 4, an 11-MHz offset fade of 7.5-dB depth is applied to the main polarization path, and even though the interferer has a flat fade, because of the phase $\phi_I$ imposed on it, $U_{i,II}$ and $U_{q,II}$ are nonzero Nyquist-shaped pulses with their relative positions also determined by the phase and timing imposed on them by the dominant polarization signal.

Figure 5:
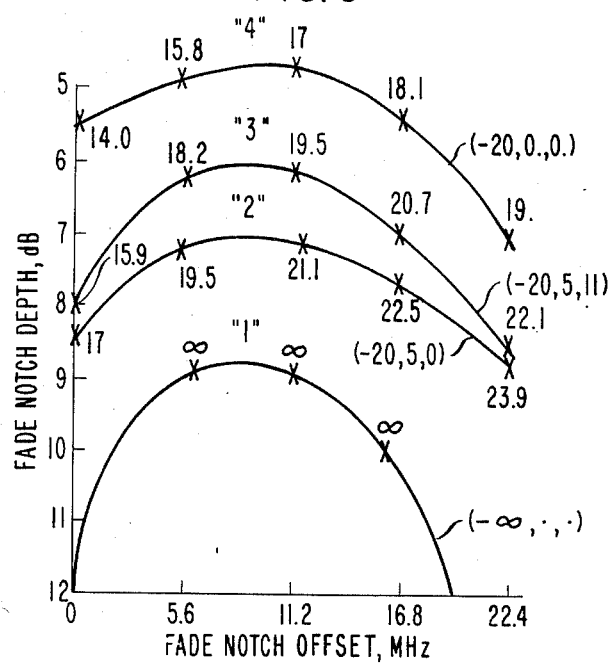
FIG. 5 illustrates performance signature curves for dual-polarized 16-QAM radio signals for predetermined parameters.

The performance signatures of the main polarization signal (i=I) which provide a locus of fade notch depth (in dB) and relative fade notch positions (in MHz) for a $10^{-3}$ probability of error are illustrated in FIG. 5, that is, $-20 \log |1-\rho_I|$ versus $\Delta f_{0I}$, where $\rho_I$ is dispersive fade notch depth of the main polarization path, and $\Delta f_{0I}$ denotes its fade notch positions relative to the carrier frequency. Along the curves there is specified average signal-to-interference ratios at a selected number of points. As a reference the signature of a single-polarization 16-QAM system, i.e., $a_{II}=0$ is illustrated and labeled "1". A comparison of curves labeled "2" through "4" for different fadings of the interferer in FIG. 5 reveals the aforementioned fact that the system outage time (area under the M-curve) is related to the net interfering power whether the interfering signal is mildly dispersive or not. For example, a comparison of curves "4" and "2", with the same 20 dB flat power levels and 0-MHz notch offsets, reveals that curve "2," with a 5-dB inband notch, results in less outage time than the fade of curve "4," with no inband notch. Hence, the greater power loss associated with curve "2" leads to reduced outage, even through the intersymbol interference for curve "2" exceeds that of curve "4". In considering curves "2" and "3", the data corresponds to identical flat power levels and fade notch depths, with the notch position moving from 0 MHz (notch centered) to 11 MHz (near the band edge). The notch-centered fade causes less outage than the notch offset fade because the unfaded signal spectral energy at 0 MHz is much more than that near 11 MHz; hence, the relationship of curves "3" and "2" is again that of diminished net signal power in the interferer resulting in a reduced outage time. All these illustrative curves were drawn for a 60-dB signal-to-noise ratio (SNR), 22.5-Mbaud symbol rate, $\Gamma=0.45$ roll-off, and 16-QAM radio system.

Interference power has been found to be directly related to the area of the cross-coupled signal power spectral density. Thus, in dual-polarization operation, where the cross-polarized signals are transmitted co-channel, any reduction of interfering signal power spectral density area leads to a decrease in the overlap area between the main and cross-coupled signal densities and, as a result, a reduction in the interfering power. Therefore, a cross-polarization interference canceller capable of performing such task will bring about an improvement in the performance of the dual-polarized system. It has also been found that the main lobe sample of a Nyquist-type pulse is proportional to the area of its frequency spectrum. Based on such finding, the present canceller arrangement provides improvements in dual-polarized system performance signatures by cancelling the main lobe of the cross-coupled interferer in the time domain.

Turning now to the arrangement of FIG. 1, as was stated hereinbefore, the present cross-polarization cancellation arrangement comprises a canceller section 10 and an equalizer section 11. At the receiver, the baseband demodulated first and second orthogonally polarized signals, which will be considered hereinafter as linearly polarized vertical and horizontal polarized signals, respectively, for purposes of illustration, are received from a demodulator means on input lines 12 and 13, respectively.

The demodulated vertically polarized input signal is provided as an input to a delay means 14 and a main lobe estimator means 15. Estimator means 15 processes the input signal to initially provide a rough version of the received M-QAM symbol of the interfering cross-polarized signal. The output from estimator means 15 is provided to a decision circuit 16 and a difference circuit 17. Decision circuit 16 is essentially a detector, or slicer, which generates an output signal representative of the level of the M-QAM input symbol. The difference between the input and output signals of decision circuit 16 is determined in difference circuit 17 which generates an error control signal representative of such difference which is transmitted back to estimator means 15. Estimator means 15 uses this error signal to update its transversal taps and provide a robust estimate thereof at its output. Estimator means 15 can comprise a multi-tap transversal equalizer, and detection circuit 16 and difference circuit 17 can comprise any suitable arrangement well known in the art which functions as described.

The output from decision circuit 16 is also transmitted through an adaptation means 18 which multiples the signal from decision circuit 16 with a predetermined canceller coefficient, or weighting factor, to adjust the level of the output signal from circuit 16. Adaptation means can comprise, for example, an accumulator and multiplier circuit in series and can adaptively alter the canceller coefficient value to provide for changing conditions in the received signals. The adjusted signal from adaptation means 18 is then subtracted from a delayed demodulated horizontally polarized main input signal in a subtraction means 19. Therefore, estimator means 15, decision circuit 16, difference circuit 17 and adaptation circuit 18 function to make preliminary estimates of the main lobe of the pulse response of the main path and then form an adaptively weighted estimate signal of said main lobe which is subtracted, in subtraction means 19, from the vertically polarized input signal in path 13 which has been properly delayed in delay means 20 to eliminate the interfering main lobe from the delayed horizontally polarized signal.

The demodulated horizontally polarized input signal, received on line 13, is similarly processed in a main lobe estimator means 21, decision circuit 22, difference circuit 23 and adaptation means 24 to provide an estimate of the main lobe of the pulse response of the associated main path and then form an adaptively weighted estimate signal of said main lobe which is subtracted, in subtraction means 25, from the received vertically polarized input signal which has been properly delayed in delay means 14 to eliminate the interfering main lobe from the received vertically polarized signal. The resultant output signals from subtraction means 25 and 19 are then delivered to equalizer section 11.

Equalizer section 11 is shown as comprising system equalizers 30 and 34 coupled to the output of subtraction means 25 and 19, respectively. The outputs from system equalizers 30 and 34 are coupled to the input of decision circuits 31 and 35, respectively, each of which function in the manner described for decision circuits 16 or 22 to make a decision of the M level of the QAM symbol. The difference between the input and output signals of decision circuit 31 is determined in a difference circuit 32 to generate a representative error control signal which is fed back to the system equalizer 30. System equalizer 30 uses this error control signal to adaptively adjust the system equalizer for proper equalization. Similarly, the input and output from decision circuit 35 is used by difference circuit 36 to generate an appropriate error control signal for transmission back to system equalizer 34 for adaptively adjusting the equalization provided by system equalizer 34.

The function of equalizer section 11 is to mitigate intersymbol and cross-rail interference. The outputs from difference circuits 32 and 36 are also transmitted back to adaptation means 18 and 24, respectively, to aid in adaptively deriving the appropriate weights to be applied by adaptation means 18 and 24, respectively, to the outputs from respective decision circuits 16 and 22. Additionally, tap coefficients of the main lobe estimators 15 and 21 can be either (a) derived from the preliminary error control signals from decision circuits 16–17 and 22-23, respectively, or (b) to obtain better performance, determined by using the error control signals from the final decision and difference circuits 31-32 and 35-36, respectively, as shown by the dashed line. The slow channel time variations allow the usage of the final error signals in estimating the tap coefficients of the estimator means 15 and 21.

Figure 6:
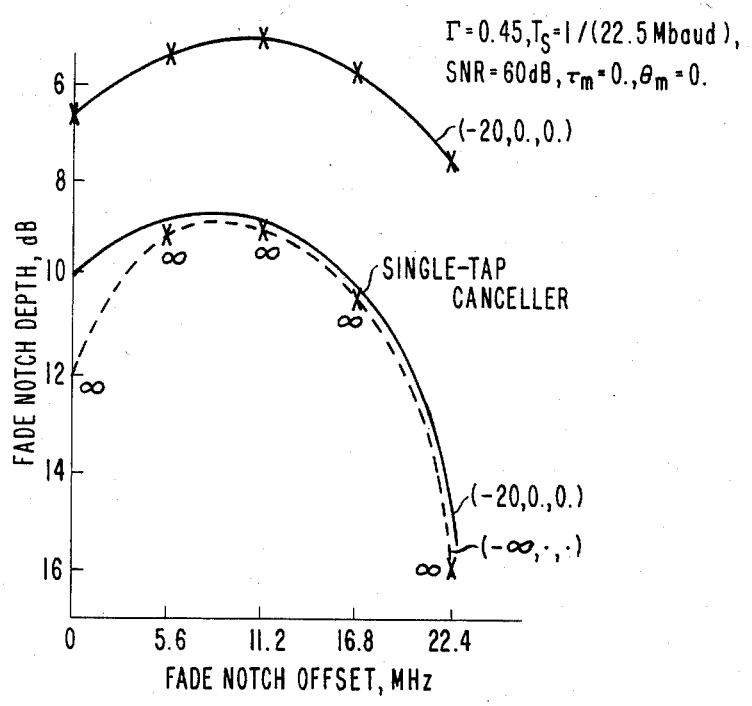
FIGS. 6 and 7 illustrate canceller performance in a dual-polarized 16-QAM radio system for the uncancelled, single-tap canceller, and single-polarization systems with predetermined parameters for the case of synchronous local oscillators at the transmitter and minimum phase fading of the main polarization signal.
Figure 7:
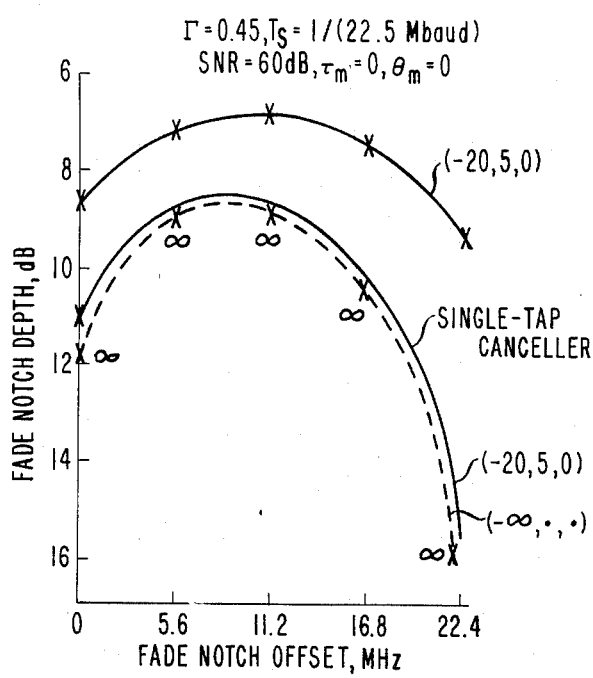
Figure 8:
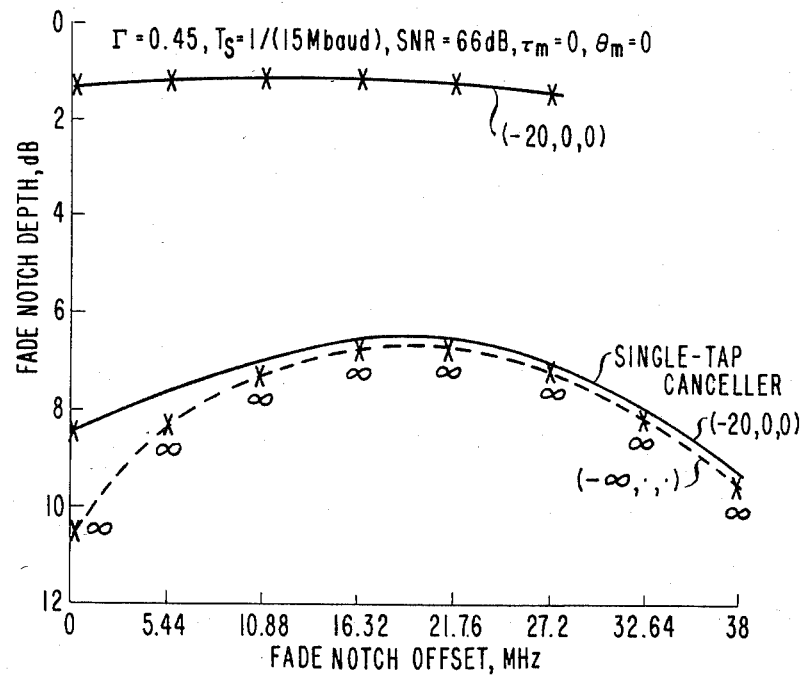
FIGS. 8 and 9 illustrate canceller performance in a dual-polarized 64-QAM radio system for the uncancelled, single tap canceller, and single-polarization systems with predetermined parameters for the case of synchronous local oscillators at the transmitter and minimum phase fading of the main polarization signal.
Figure 9:
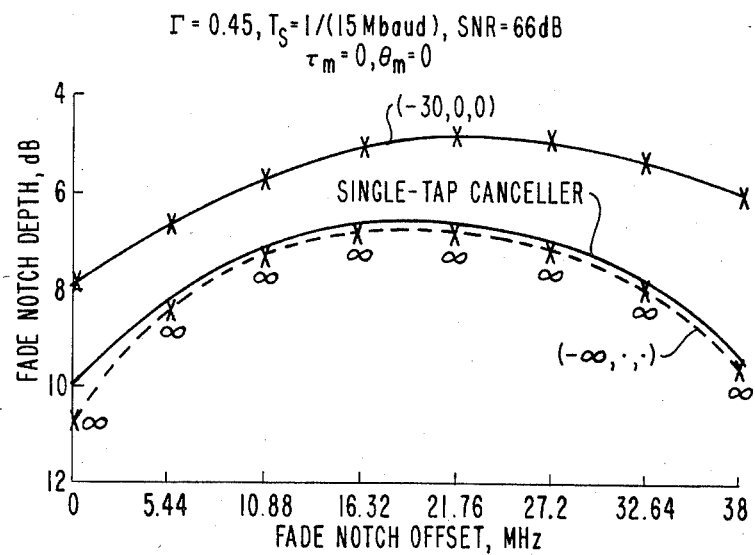
Figure 10:
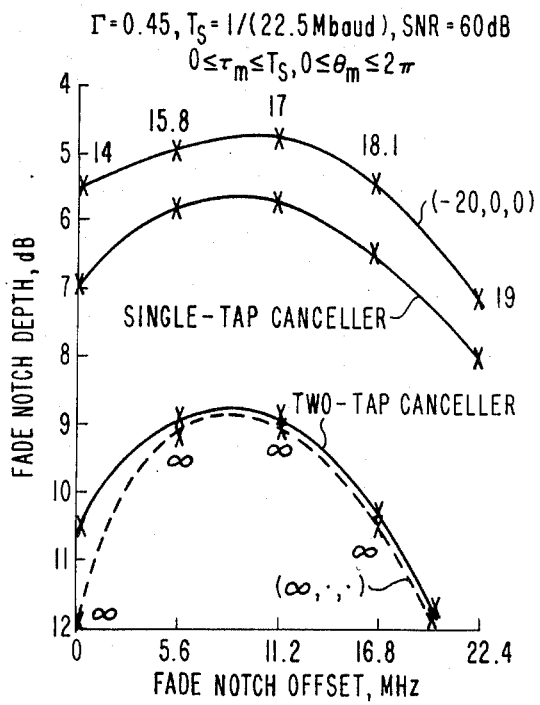
FIGS. 10 and 11 illustrate canceller performance in a dual-polarized 16-QAM radio system used to generate the curves of FIGS. 6 and 7, respectively, but for the case of asynchronous local oscillators at the transmitter.
Figure 11:
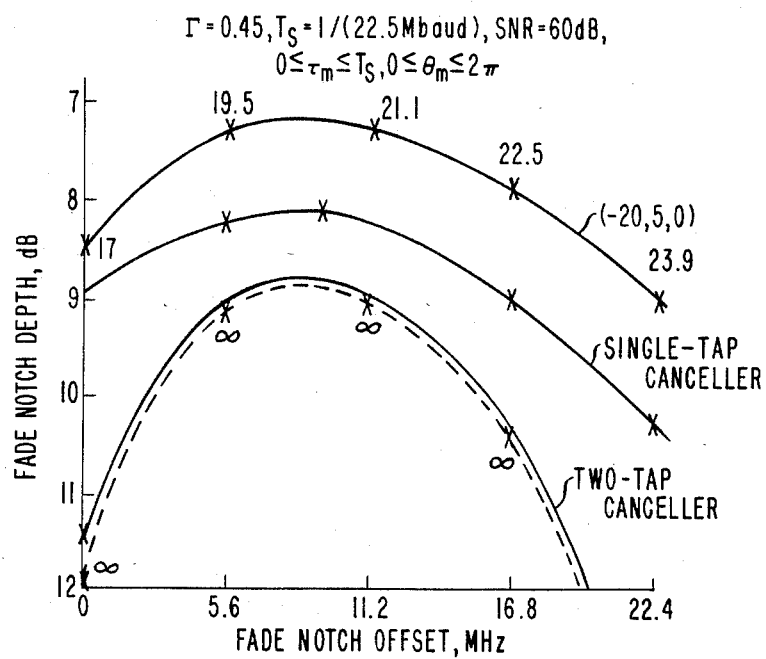
Figure 12:
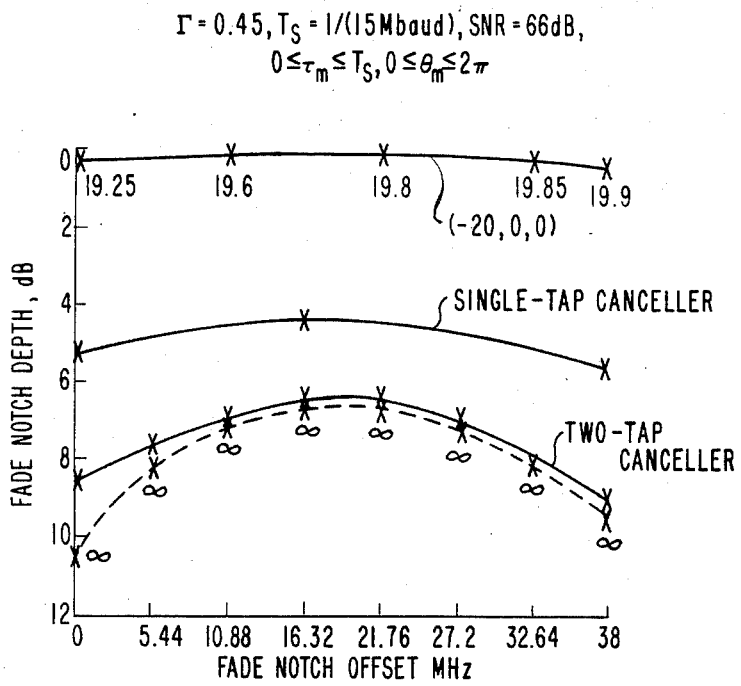
FIGS. 12 and 13 illustrate canceller performance in a dual-polarized 64-QAM radio system used to generate the curves of FIGS. 8 and 9, respectively, but for the case of asynchronous local oscillators at the transmitter.
Figure 13:
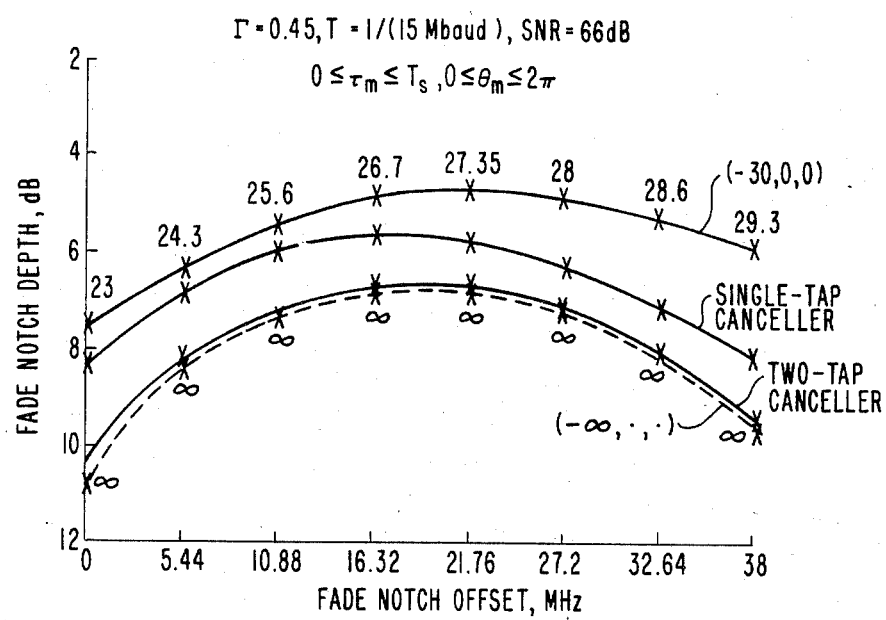

For the case where $\theta_m=0$ and $\tau_m=0$, that is, when the two polarization sequence timing and IF local oscillators 40 and 41 of FIG. 2 are synchronized, typical canceller performance for 16 QAM radio is shown in FIGS. 6 and 7 and for 64 QAM radio is shown in FIGS. 8 and 9 for dispersive fades as indicated. For the synchronous case, use of a single complex decision feedback tap to cancel the real and imaginary parts of the cross-coupled interferer main-lobe samples renders performance signatures in dual-polarization operation practically identical to those of a single-polarization system. As indicated, in the synchronous case, only a single complex tap is adequate to remove the main lobe of the interferer because the interferer's main lobe always coincides with the desired symbol's main lobe. In FIGS. 6 and 7, all of the curves are derived for a 60-dB Signal-To-Noise Ratio (SNR), 22.5-Mbaud symbol rate, $\Gamma=0.45$ roll-off, 16-QAM radio; and in FIGS. 8 and 9 the signatures for 64-QAM radio were derived for a 66-dB SNR, 15-Mbaud symbol rate, and $\Gamma=0.45$ roll-off. In each case, however, it is to be noted that equalization of the main polarization signal is not included.

For the case of asynchronous transmitter local oscillators 40, FIGS. 10-13 illustrates a single and two-tap canceller performance for conditions which correspond to the conditions for FIGS. 6-9, respectively, but with different values of $\tau_m$ and $\theta_m$ representing the asynchronous case. In each of FIGS. 10-13, the performance signature before cross-polarization cancellation is shown in the top curve, the single- and two-tap signatures after cancellation are labeled accordingly, and the bottom curve represents the performance signature of a single-polarized 16- or 64-QAM radio system. In each of FIGS. 10-13, equalization of the main polarization signal is excluded. In each case the outage performance of the dual-polarization system after cancellation using two complex taps is very close to that of the single-polarization system. If the timing oscillators 40 are not synchronized at the transmitter, the interferer main-lobe position can be displaced in time by up to one baud period with respect to the desired polarization main lobe. Hence, a 2-tap canceller guarantees substantial cancellation of the interferer main lobe at all times. Of course, this occurs only if the frequency drift of timing oscillators 40 is small enough in comparison to the speed at which the adaptive loops can update the canceller tap coefficients. Since crystal oscillators used for the timing oscillators drift by only a few parts in a million cycles, this should be no problem. Structures of a two-tap canceller used in the asynchronous case are similar to what is shown in FIG. 1 except for the addition of a second complex tap following the first one (adaptation circuit 18) with a baud interval delay in between. The foregoing discussion has pertained primarily to minimum phase fading of the main polarization signal. In evaluating the canceller of the present invention under nonminimum phase fades, it was found that the canceller performance is practically transparent to the type of fade.

What is claimed is:

1. A cross-polarization interference cancellation arrangement comprising:
   a first and a second input terminal capable of receiving a first and a second orthogonally polarized baseband digital input signal, respectively;
   a first and a second output terminal;
   canceller means connected to the first and second input terminals and responsive to a received first and second orthogonally polarized baseband input signal for determining therefrom a first and a second estimate, respectively, of a main lobe of a pulse response of the respective first and second input signals, and for generating from the first and second estimates a respective first and second cancellation output signal of a proper phase and amplitude which is introduced into the second and first orthogonally polarized input signals, respectively, to generate respective second and first canceller means output signals wherein the main lobe of an interfering orthogonally polarized signal is substantially cancelled; and
   equalizer means responsive to the first and second canceller means output signals for substantially equalizing therein any intersymbol and cross-rail interference components for providing a resultant first and second equalizer means output signal to the first and second output terminals, respectively.

2. A cross-polarization interference cancellation arrangement according to claim 1 wherein the canceller means comprises:
   main lobe estimator means responsive to the first and second orthogonally polarized baseband digital canceller arrangement input signals for generating a respective first and a second output signal each of which is representative of the main lobe of a pulse response of the first and second orthogonally polarized baseband digital cancellation arrangement input signals, respectively; and
   adapting means responsive to the first and second output signals from the estimator means for adjusting said first and second estimator means output signals in a predetermined manner and generating a first and second output signal, respectively, which is combined with the respective second and first canceller arrangement input signal for substantially cancelling an interfering orthogonally polarized signal in each of said delayed cancellation arrangement first and second input signals.

3. A cross-polarization interference cancellation arrangement according to claim 2 wherein the canceller means further comprises:
   decision means, disposed between the estimator means and the adapting means, for determining a correct value for any digital symbols in each of the first and second estimator means output signals, which correct value is provided to the adapting means, and for generating a first and a second error control signal representative of a determined error in the respective first and second output signals from the estimator means; and
   the main lobe estimator means is responsive to the first and second error signals from the decision means for adaptively correcting the first and second output signals, respectively, in a manner for reducing any error therein.

4. A cross-polarization interference cancellation arrangement according to claim 2 wherein the equalizer means comprises:

a first and a second equalizer responsive to the first and second output signals from the canceller means, respectively, for substantially cancelling any intersymbol and cross-rail interference components in said respective first and second canceller means output signals and for generating respective first and second equalizer output signals not including said interference components; and first and second decision means responsive to the first and second output signals from the first and second equalizers, respectively, for determining therefrom a correct value for any digital symbols in each of the first and second equalizer output signals for delivery to the respective first and second cancellation arrangement output terminals, and for generating a first and second error signal representative of an error between the first and second equalizer output signals and an associated determined correct digital symbol, said first and second equalizers being responsive to the first and second error signal, respectively, for adaptively reducing the error in the respective first and second equalizer output signals.

5. A cross-polarization interference cancellation arrangement according to claim 4 wherein
the adapting means is responsive to the first and second error control signals from the decision means of the equalizer means for adaptively adjusting said first and second output signals, respectively, from the main lobe estimator means in a predetermined manner.

6. A cross polarization interference cancellation arrangement in accordance with claim 5 wherein
the main lobe estimator means is responsive to the first and second error control signals from the decision means of the equalizer means for adaptively correcting the first and second output signals, respectively, in a manner for reducing any errors therein.

* * * * *